(12) United States Patent
Guo

(10) Patent No.: US 9,569,299 B2
(45) Date of Patent: Feb. 14, 2017

(54) SYSTEM AND METHOD FOR TREATING SERVER ERRORS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Li-Wen Guo, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 239 days.

(21) Appl. No.: 14/466,349

(22) Filed: Aug. 22, 2014

(65) Prior Publication Data
US 2015/0058666 A1 Feb. 26, 2015

(30) Foreign Application Priority Data
Aug. 23, 2013 (CN) .................... 2013 1 03720993

(51) Int. Cl.
*G06F 11/00* (2006.01)
*G06F 11/07* (2006.01)
(52) U.S. Cl.
CPC ....... *G06F 11/0793* (2013.01); *G06F 11/0721* (2013.01)

(58) Field of Classification Search
CPC . G06F 11/709; G06F 11/0757; G06F 11/0793; G06F 13/4221
See application file for complete search history.

(56) References Cited

U.S. PATENT DOCUMENTS

| | | | |
|---|---|---|---|
| 7,099,934 B1* | 8/2006 | Ewing ....................... | G06F 1/26 307/11 |
| 2005/0050385 A1* | 3/2005 | Chen ................... | G06F 11/0709 714/11 |
| 2005/0235083 A1* | 10/2005 | Tsushima ............ | G06F 13/4221 710/104 |
| 2006/0150009 A1* | 7/2006 | Takemori ............ | G06F 11/0724 714/12 |
| 2007/0088988 A1* | 4/2007 | Gupta ................. | G06F 11/2268 714/48 |
| 2008/0256400 A1* | 10/2008 | Yang ................... | G06F 11/0745 714/57 |
| 2011/0231639 A1* | 9/2011 | Chien ....................... | G06F 1/26 713/2 |

(Continued)

*Primary Examiner* — Bryce Bonzo
*Assistant Examiner* — Jeison C Arcos
(74) *Attorney, Agent, or Firm* — Zhigang Ma

(57) ABSTRACT

An error handling system as applied to a server, the server comprising a central processing unit, the central processing unit configured to send a warning signal when the central processing unit generates an error. The error handling system includes a programmable logic device, a baseboard management controller coupled to a southbridge chip, and a basic input-output system coupled to the baseboard management controller. The southbridge chip is configured to detect the warning signal and send a notification signal to the baseboard management controller upon detection. The basic input-output system is configured to identify the error and correct the error upon receiving the notification signal.

8 Claims, 3 Drawing Sheets

(56) References Cited

U.S. PATENT DOCUMENTS

| | | | |
|---|---|---|---|
| 2012/0131384 A1* | 5/2012 | Zou | G06F 11/0724 714/24 |
| 2012/0144245 A1* | 6/2012 | Fan | G06F 11/0787 714/43 |
| 2015/0058666 A1* | 2/2015 | Guo | G06F 11/0721 714/10 |

* cited by examiner

SYSTEM AND METHOD FOR TREATING SERVER ERRORS

RELATED APPLICATIONS

This application claims priority to China Patent Application No. 201310372099.3 filed on Aug. 23, 2013 in the China Intellectual Property Office, the contents of which are hereby incorporated by reference. Relevant subject matter is disclosed in co-pending U.S. Patent Applications entitled "ERROR CORRECTING SYSTEM AND METHOD FOR SERVER", U.S. application Ser. No. 14/465,356.

FIELD

The disclosure generally relates to system and methods, and particularly relates to a system and method for treating server errors.

BACKGROUND

A server usually includes a central processing unit, and the central processing unit may generate errors.

BRIEF DESCRIPTION OF THE DRAWINGS

Many aspects of the embodiments herein can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
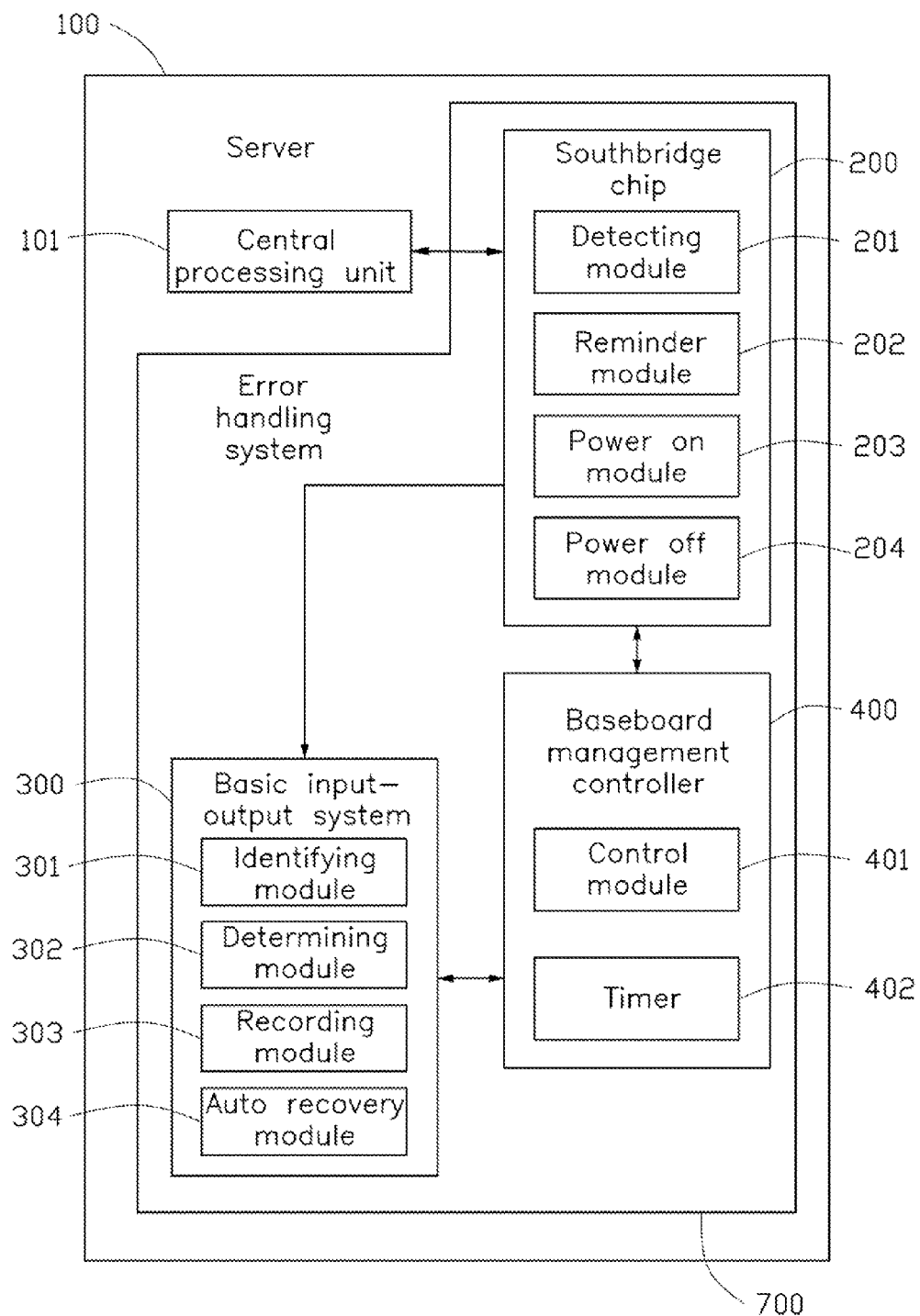
FIG. 1 is a block diagram of one embodiment of an error handling method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. In addition, the description is not to be considered as limiting the scope of the embodiments described herein. The drawings are not necessarily to scale and the proportions of certain parts have been exaggerated to better illustrate details and features of the present disclosure.

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives. The term "coupled" is defined as connected, whether directly or indirectly through intervening components, and is not necessarily limited to physical connections. The connection can be such that the objects are permanently connected or releasably connected.

FIG. 1 illustrates an error handling system 700 of the disclosure. The error handling system 700 can be applied to a server 100. The server 100 can include a central processing unit 101. The central processing unit 101 can send a warning signal when the central processing unit 101 generates an error. The error handling system 700 can include a southbridge chip 200, a basic input-output system 300, and a baseboard management controller 400. The basic input-output system 300 is coupled to the southbridge chip 200 and the baseboard management controller 400. The baseboard management controller 400 is coupled to the southbridge chip 200.

The southbridge chip 200 can be configured to detect the warning signal and send an notification signal to the basic input-output system 300 after the warning signal is detected. The basic input-output system 300 can be configured to retrieve correct the generated error upon receiving the notification signal.

The southbridge chip 200 can include a detecting module 201, a reminder module 202, a power on module 203, and a power off module 204. The basic input out system 300 can include a identifying module 301, a determining module 302, a recording module 303, and an auto recovery module 304. The baseboard management controller 400 can include a control module 401 and a timer 402.

The detecting module 201 is configured to detect the warning signal. The reminder module 202 is configured to send the notification signal to the identifying module 301 after the warning signal is detected. The identifying module 301 is configured to retrieve the generated error after receiving the notification signal. The determining module 302 is configured to determine if the generated error matches a predetermined error. The determining module 302 can be configured to send a restart signal to the baseboard management controller 400 when the generated error matches the predetermined error.

The control module 401 can be configured to send a power off signal to the power off module 204 upon receiving the restart signal. The power off module 204 can be configured to power off the server 100 after receiving the power off signal.

The power off module 204 can be configured to send a time recording signal. The timer 402 can be configured to record time when the server 100 is powered off. The control module 401 can be configured to determine if the recorded time is equal to a predetermined time, and send a power on signal to the power on module 203 when the actual time is greater than the predetermined time. The power on module 203 can be configured to power on the server 100 when the recorded time is equal to the predetermined time. The auto recovery module 404 is configured to recover the server 100 when the generated error does not match the predetermined error. The recording module 403 can be configured to record the error.

Figure 2:
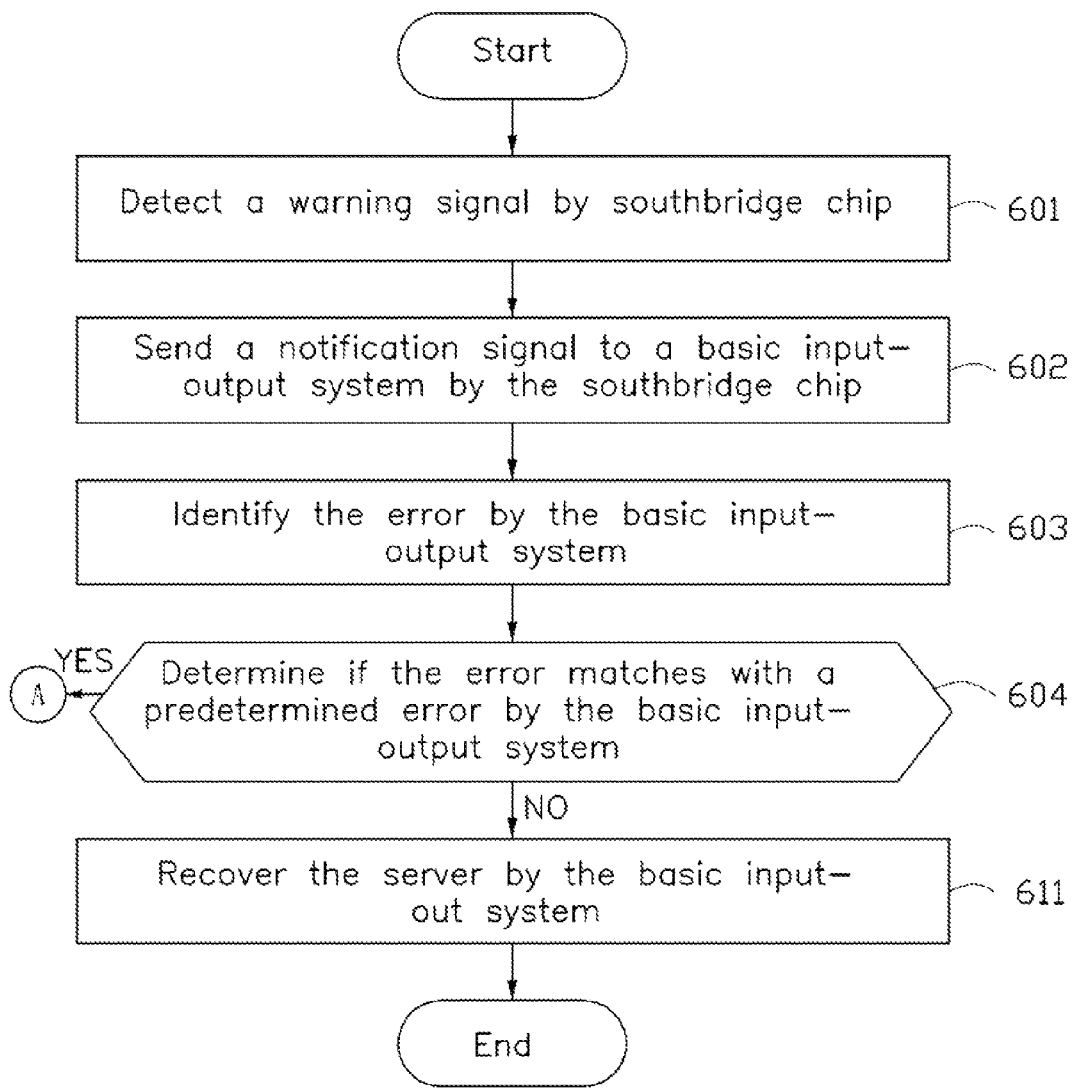
FIG. 2 is a flowchart of an error handling method.
Figure 3:
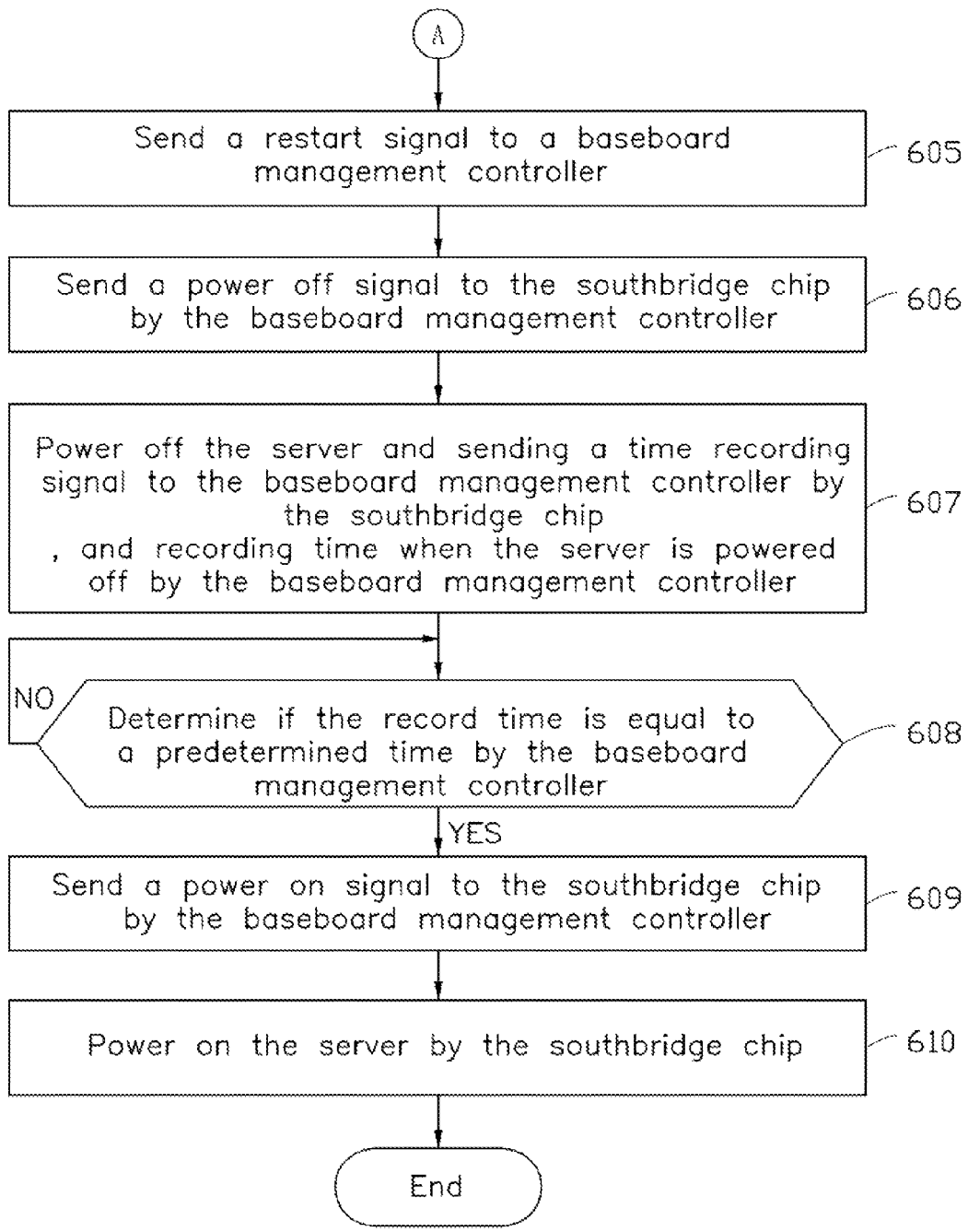
FIG. 3 is flowchart of block A of FIG. 2.

FIGS. 2-3 show a flowchart of an error handling method applied to a server, the server comprising a central processing unit, the central processing unit configured to send a warning signal when the central processing unit generates error, and the error handling method comprises the following blocks:

In block 601, a southbridge chip detects the warning signal.

In block 602, the southbridge sends a notification signal to a basic input-output system.

In block 603, the basic input-output system identifies the generated error.

In block 604, the basic input-output system determines if the generated error matches with a predetermined error. When the generated error matches a predetermined error, the method goes to block 605. When the error does not match with the predetermined error, the method goes to block 611.

In block 605, the determines module sends a restart signal to a baseboard management controller.

In block 606, the baseboard management controller sends a power-off signal to the southbridge chip.

In block 607, the southbridge chip powers off the server and sends a time recording signal to the baseboard management controller, and the baseboard management controller records time when the server is powered off.

In block 608, the baseboard management controller determines if the time is equal to a predetermined time. When the time is equal to the predetermined time, the method goes to block 609. When the time is not equal to the predetermined time, the method goes to block 608.

In block 609, the baseboard management controller sends a power on signal to the southbridge chip.

In block 610, the southbridge chip powers on the server.

In block 611, the basic input-output system recovers the server.

Certain steps or methods described herein may be removed, others may be added, and the sequence of steps may be altered. The description and the claims drawn for or in relation to a method may give some indication in reference to certain steps. However, any indication given is only to be viewed for identification purposes, and is not necessarily a suggestion as to an order for the steps.

The embodiments described herein are illustrative, and should not be construed as limiting the following claims.

What is claimed is:

1. An error handling system applied to a server, the server comprising a central processing unit configured to send a warning signal if the central processing unit generates an error, and the error handling system comprising:
   a southbridge chip comprising:
      a power on module, and
      a power off module;
   a basic input-output system coupled to the southbridge chip, the basic input-output system comprising:
      an identifying module; and
   a baseboard management controller system comprising;
      a determining module;
      a control module; and
      a timer,
   wherein the southbridge chip is configured to detect the warning signal and send a notification signal to the basic input-output system upon detection; and
   the basic input-output system is configured to identify and correct the generated error upon receiving the notification signal, the identifying module identifies the error after receives the notification signal, the determining module determines if the error matches a predetermined error and sends a restart signal to the baseboard management controller system when the error matches the predetermined error, and the baseboard management controller is configured to control the southbridge chip to reboot the server after receiving the restart signal, the control module is configured to send a power off signal to the power off module after receiving the restart signal, and the power off module is configured to power off the server after receiving the power off signal, and the power on module is configured to power on the server after a predetermined time when the server is thus powered off, the power off module being further configured to send a recording signal, the timer is configured to record time when the server is powered off, and the power on module is configured to power on the server when the recorded time is equal to the predetermined time.

2. The error handling system of claim 1, wherein the southbridge chip comprises a detecting module and a reminder module; the detecting module is configured to detect the warning signal, and the reminder module is configured to send the notification signal to the basic input-output system.

3. The error handling system of claim 1, wherein the control module is configured to determine if the recorded time is equal to the predetermined time and send a power on signal to the power on module when the recorded time is equal to the predetermined time, and the power on module is configured to power on the server.

4. The error handling system of claim 1, wherein the basic input-output system further comprises an auto recovery module configured to recover the server when the error does not match the predetermined error.

5. The error handling system of claim 1, wherein the basic input-output system further comprises a recording module configured to record the error.

6. An error handling method applied to a server, the server comprising a central processing unit configured to send a warning signal if the central processing unit generates an error, and the error handling method comprising:
   detecting the warning signal;
   sending a notification signal to a basic input-output system;
   identifying the generated error;
   determining if the generated error matches a predetermined error;
   sending a restart signal to a baseboard management controller when the error matches the predetermined error;
   sending a power off signal to a southbridge chip;
   powering off the server;
   sending a time recording signal to the baseboard management controller;
   recording time when the server is powered off;
   determining if the recorded time is equal to a predetermined time; and
   powering on the server when the recorded time is equal to the predetermined time restarting the server; and
   correcting the generated error.

7. The error handling method of claim 6, wherein after determining if the recorded time is equal to a predetermined time and before powering on the server when the recorded time is equal to the predetermined time, the error handling method further comprises:
   sending a power on signal to the southbridge chip when the time is equal to the predetermined time; and
   powering on the server.

8. The error handling method of claim 6, further comprising:
   recovering the server when the error does not match the predetermined error.

* * * * *